(12) United States Patent
Whittaker

(10) Patent No.: US 10,958,206 B1
(45) Date of Patent: Mar. 23, 2021

(54) BATTERY POWERED GENERATOR

(71) Applicant: William Whittaker, Port Washington, NY (US)

(72) Inventor: William Whittaker, Port Washington, NY (US)

(*) Notice: Subject to any disclaimer, the term of this patent is extended or adjusted under 35 U.S.C. 154(b) by 0 days.

(21) Appl. No.: 16/791,000

(22) Filed: Feb. 14, 2020

Related U.S. Application Data

(60) Provisional application No. 62/893,851, filed on Aug. 30, 2019.

(51) Int. Cl.
*H02S 10/12* (2014.01)
*F03D 9/25* (2016.01)
*H02J 7/14* (2006.01)
*F03D 9/11* (2016.01)
*F03D 9/00* (2016.01)

(52) U.S. Cl.
CPC .............. *H02S 10/12* (2014.12); *F03D 9/007* (2013.01); *F03D 9/11* (2016.05); *F03D 9/255* (2017.02); *H02J 7/1415* (2013.01)

(58) Field of Classification Search
None
See application file for complete search history.

(56) References Cited

U.S. PATENT DOCUMENTS

| | | | |
|---|---|---|---|
| 7,823,906 B2 | 11/2010 | Darling, III | |
| 8,327,481 B2 | 12/2012 | Molinaro | |
| 8,593,102 B2 | 11/2013 | McGuire et al. | |
| 10,424,933 B2 * | 9/2019 | Narla | H02J 3/383 |
| 2005/0236172 A1 * | 10/2005 | Bushey | H02G 3/0425 174/481 |
| 2007/0221515 A1 | 9/2007 | Lindley | |
| 2008/0114499 A1 * | 5/2008 | Hakim | G06Q 50/06 700/291 |
| 2011/0101794 A1 | 5/2011 | Schroeder et al. | |
| 2013/0257346 A1 * | 10/2013 | Jakins | H02J 7/35 320/107 |
| 2014/0265695 A1 * | 9/2014 | Thompson | H02P 27/06 310/113 |
| 2015/0137520 A1 * | 5/2015 | Garcia | H02J 3/386 290/44 |
| 2016/0126783 A1 * | 5/2016 | Cheng | H02J 9/061 307/66 |
| 2017/0070050 A1 * | 3/2017 | Wang | H02J 3/008 |
| 2017/0271874 A1 * | 9/2017 | Luke | H02J 3/16 |

* cited by examiner

*Primary Examiner* — Jared Fureman
*Assistant Examiner* — Joel Barnett
(74) *Attorney, Agent, or Firm* — Boudwin Intellectual Property; Daniel Boudwin

(57) ABSTRACT

A battery powered generator. The battery powered generator has a housing including a rechargeable battery. A pedal assembly, a wind turbine, and at least one solar panel are removably securable to the housing, enabling a user to choose any combination of which to recharge the battery. When secured to the housing, the pedal assembly, the wind turbine, and the at least one solar panel are operably connected to the rechargeable battery. A subpanel and an electrical panel are also operably connected to the rechargeable battery. An automatic transfer switch is operably connected to the electrical panel, the rechargeable battery, and the subpanel, and can control a flow of. The battery powered generator can be recharged by a variety of devices, or a combination thereof, to provide an uninterrupted flow of electricity in the event the electrical panel is unable to.

1 Claim, 2 Drawing Sheets

BATTERY POWERED GENERATOR

CROSS REFERENCE TO RELATED APPLICATIONS

This application claims the benefit of U.S. Provisional Application No. 62/893,851 filed on Aug. 30, 2019. The above identified patent application is herein incorporated by reference in its entirety to provide continuity of disclosure.

BACKGROUND OF THE INVENTION

The present invention relates to alternative sources of electricity. More particularly, the present invention provides for a battery powered generator that can be recharged by a variety of devices, or a combination thereof, to provide a continuous flow of electricity in the event a home's electric panel is unable to.

Many people power countless items with electricity such as televisions, refrigerators, fans, stoves, computers, and more. In the event of a power outage, many of these devices are rendered inoperable. Without power, food stored in a refrigerator may thaw, defrost, or go bad. Without power, heating and cooling device will not work, and temperatures may quickly fall outside a desired comfortable range. Without power, lights may not work leaving people to fumble around in the dark. Some systems simply maintain creature comforts such as a fully charged cellphone. All these systems, however, rely on a steady and uninterrupted source of electricity.

Devices have been disclosed in the known art that relate to alternative sources of electricity. These include devices that have been patented and disclosed in patent application publications. However, the devices in the known art have several drawbacks. Some alternative sources of electricity include home batteries. Some home batteries are reliant on gas to power them, while others are reliant solely on solar energy. Typically, home batteries can only accommodate one form of alternate energy to charge the battery and are unable to integrate various sources of electricity together. Some home batteries require a ramp-up time and do not provide a seamless transition between the electricity supplied by the electric grid and the switch-over to the battery. Some home batteries automatically switch over from the electric grid to the battery in the event of power loss. However, these require additional parts, such as a transfer switch, which are installed in a separate unit from the battery. Some home batteries do not focus on a subset of the home, and instead attempt to power the entire home at once.

The present invention substantially diverges in design elements from the known art and consequently it is clear that there is a need in the art for an improvement to existing alternative sources of electricity. In this regard the present invention substantially fulfills these needs.

SUMMARY OF THE INVENTION

In view of the foregoing disadvantages inherent in the known types of alternative sources of electricity now present in the prior art, the present invention provides a battery powered generator wherein the same can be utilized to provide a continuous flow of electricity in the event a home's electric panel is unable to. The present battery powered generator comprises a housing including a rechargeable battery. A pedal assembly, a wind turbine, and at least one solar panel are removably securable to the housing, enabling a user to choose any combination of which to recharge the battery. When secured to the housing, the pedal assembly, the wind turbine, and the at least one solar panel are operably connected to the rechargeable battery. A subpanel disposed in the housing and an electrical panel are also operably connected to the rechargeable battery. An automatic transfer switch is operably connected to the electrical panel, the rechargeable battery, and the subpanel, and can control a flow of electricity into the subpanel from the main electrical panel or from the rechargeable battery.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
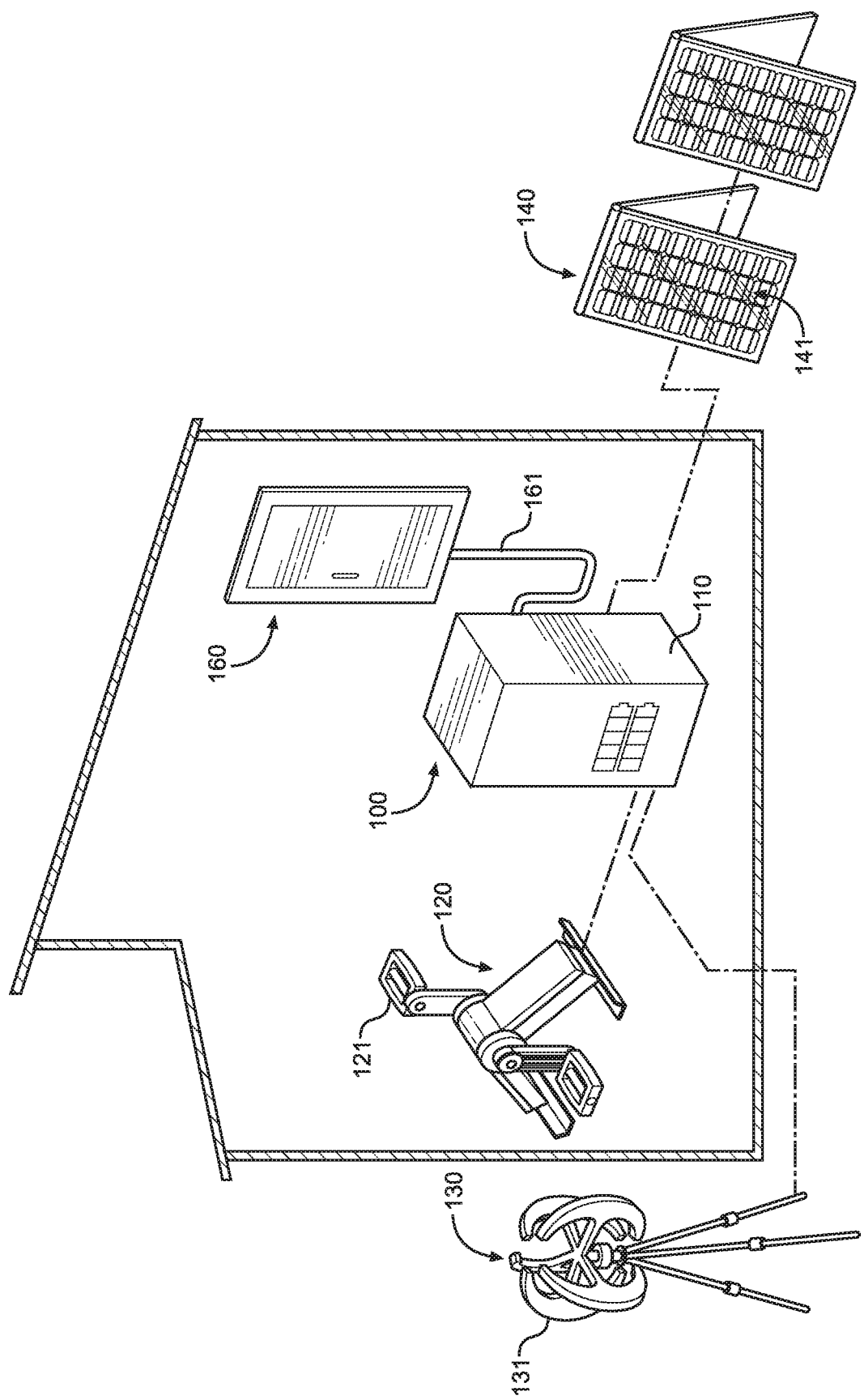
FIG. 1 shows a perspective view of an embodiment of the battery powered generator.

Reference is made herein to the attached drawings. Like reference numerals are used throughout the drawings to depict like or similar elements of the battery powered generator. For the purposes of presenting a brief and clear description of the present invention, a preferred embodiment will be discussed as used for the battery powered generator. The figures are intended for representative purposes only and should not be considered to be limiting in any respect.

Figure 2:
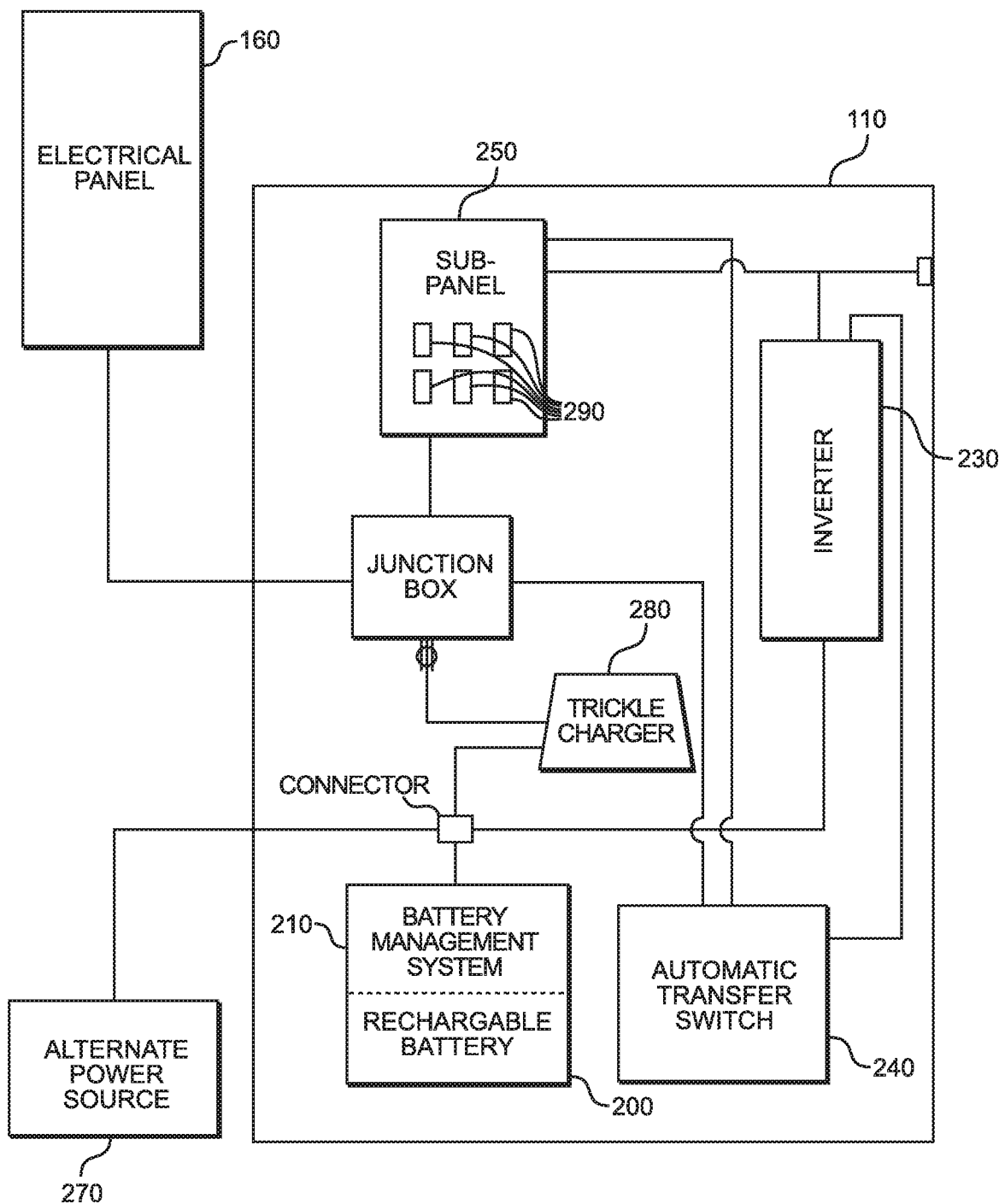
FIG. 2 shows a block diagram of an embodiment of the representative components of an embodiment of the battery powered generator.

Referring now to FIG. 1, there is shown a perspective view of an embodiment of the battery powered generator. The battery powered generator 100 comprises a housing 110 including a rechargeable battery (as shown in FIG. 2, 200). The housing 110 is configured to hold and isolate various electronic components from the environment outside of the housing 110. In the shown embodiment, the housing 110 is a steel cabinet that is configured to house a sub-panel and a rechargeable battery. In various other embodiments, the housing 110 also houses an inverter, an automatic transfer switch, at least one junction box, a trickle charger (as shown in FIG. 2, 280), and a battery management system, as further detailed below. By compactly storing the electronic components in one housing, an economy of space is preserved, and the battery powered generator is able to be stored and kept utilizing a minimum of storage space in a building.

A pedal assembly 120, a wind turbine 130, and at least one solar panel 140 are removably securable to the housing 110. The housing 110 is configured to receive all three of the pedal assembly 120, wind turbine 130, and solar panel 140 at the same time. One of ordinary skill in the art will understand that as the three components are removably securable, the housing 110 is also configured to receive or any combination of the three individually, or in combination. The pedal assembly 120, wind turbine 130, and solar panel 140 are operably connected to the rechargeable battery when secured to the housing 110. In one embodiment, the pedal assembly 120, wind turbine 130, and solar panel 140 are connected to the housing via at least one electric cable and received by at least one receptacle in the housing in electrical communication with the rechargeable battery.

The pedal assembly 120 comprises a series of pedals 121 that can be rotated about an axis. Each of the pedals 121 are configured to receive a foot of a user and can be pedaled in the same manner as a bicycle. The rotation of the pedals 121 about the axis generates electricity which can be transferred to the battery powered generator via the electrical connection. In one embodiment, rotation of the pedals 121 can generate up to twelve volts of direct current. In a similar manner, the wind turbine 130 comprises a plurality of blades 131 which are configured to be rotated by a volume of wind passing over the plurality of blades 131. This rotation of the plurality of blades 131 of the wind turbine 130 generates electricity which can be transferred to the battery powered generator via the electrical connection. In one embodiment, rotation of the plurality of blades 131 can generate up to twelve volts of direct current. The solar panels 140 comprise a frame and a plurality of solar cells 141. One of ordinary skill in the art will understand how the solar cells 141 are able to harness the power of the sun's rays and generate electricity. In one embodiment, the solar panels 140 can generate up to twelve volts of direct current.

The ability to removably secure each of the pedal assembly 120, wind turbine 130, and solar panels 140 enables a user to selectively determine which source of alternative energy to use, or combination thereof, to generate power and recharge the rechargeable battery. For example, on an overcast but windy day, the user may elect to utilize the pedal assembly 120 and the wind turbine 130 but forego the solar panels 140. On a clear and sunny day with no wind, the user may elect to remove the pedal assembly 120 and wind turbine 130 from the assembly and store them out of the direct sunlight while the rechargeable battery is charged by the solar panels 140.

An electrical panel 160 is operably connected to the rechargeable battery. In one embodiment, the electrical panel 160 is a house electrical panel. In a further embodiment, the electrical panel 160 is connected to the housing 110 by a flexible conduit 161. In one embodiment, when the battery powered generator is installed, the electrical panel 160 is attached to the housing 110 and is not removably secured unless and until de-installation occurs. In this manner, the electrical panel 160 is permanently electrically connected to the rechargeable battery. In a further embodiment, the electrical panel 160 is operably connected to the rechargeable battery by a trickle charger. The trickle charger enables the rechargeable battery to be slowly charged by an electrical supply from the electrical panel 160 thereby ensuring that the rechargeable battery stays charged even without the pedal assembly 120, wind turbine 130, and/or solar panel 140 attached thereto.

A subpanel (as shown in FIG. 2, 250) is disposed in the housing 110, operably connected to the rechargeable battery. The subpanel comprises a plurality of circuits that can be utilized to provide power, either from the rechargeable battery or the electrical panel 160, to desired electronics. In one embodiment, the subpanel comprises six circuits (as shown in FIG. 2, 290). In such an embodiment, the six circuits can be used to provide electricity to small or medium electronic devices, but not large electronic devices such as a dryer or an oven. Such a configuration ensures that necessary elements such as a garage door, alarm, internet components, and the like have a source of power at the expense of leaving large electronics that are not needed on-demand, like a dryer or oven, without power in the case of a power outage.

An automatic transfer switch (as shown in FIG. 2, 240) is operably connected to the electrical panel 160, the rechargeable battery, and the subpanel. The automatic transfer switch is configured to control a flow of electricity into and out of the subpanel. The automatic transfer switch is configured to detect when electricity is flowing from the electrical panel 160. In one embodiment, the automatic transfer switch is configured to automatically enable the flow of electricity out of the rechargeable battery into the subpanel when an electrical supply from the electrical panel is interrupted. The automatic transfer switch is also configured to detect when the electrical flow to the electrical panel 160 has been restored. In a further embodiment, the automatic transfer switch is configured to disable the flow of electricity out of the rechargeable battery after the electrical supply from the electrical panel is restored and uninterrupted for over 45 seconds. In some circumstances an electrical supply can flicker on and off to an electrical supply. If the battery were to be turned on and off in such a circumstance, undue wear would be imposed on the rechargeable battery. By waiting and monitoring the electrical connection over 45 seconds, the stability of the electrical supply from the electrical panel 160 can be established and undue wear and tear on the rechargeable battery is avoided. In various other embodiments, the waiting period of 45 seconds can be modified to suit a user's comfort with how long to monitor the electrical supply to the electrical panel.

Referring now to FIG. 2, there is shown a block diagram of an embodiment of the representative components of an embodiment of the battery powered generator. The housing 110 includes a rechargeable battery 200. In one embodiment, the rechargeable battery 200 is a lithium ion battery to utilize low levels of heavy metals and provide high energy densities. One of ordinary skill in the art will understand that the present invention is not limited to the type of rechargeable battery, and that alternate rechargeable batteries, such as nickel-cadmium, may be utilized.

In one embodiment, the battery powered generator further comprises a battery management system 210. The battery management system 210 is configured to manage the charging and discharging of the rechargeable battery 200 and protects the rechargeable battery 200 from operating outside pre-defined safe operating parameters. The battery management system 210 is also configured to monitor the status of the battery, report data to a controller, and the like. In some embodiments, the battery management system 210 can monitor the voltage in total and for individual battery cells, average temperature for individual cells, state of charge or depth of discharge to indicate the charge level of the battery, the remaining capacity of the battery as a percentage of the original capacity, current in or out of the battery, as well as similar parameters. The battery management system 210 can protect the rechargeable battery 200 by preventing it from operating outside of pre-defined safe parameters such as: over-current, over-voltage, under-voltage, over-temperature, under-temperature, and the like. In the shown embodiment, the rechargeable battery 200 is operably connected to the battery management system 210.

In the shown embodiment, the rechargeable battery 200 is also operably connected to a trickle charger 280 and an inverter 230. One of ordinary skill in the art will understand that a trickle charger 280 is configured to enable energy to flow to a rechargeable battery 200 by forcing an electric current into the rechargeable battery 200. The inverter 230 is configured to receive a flow of electricity from an alternate power source 270, such as the pedal assembly, wind turbine, or solar panel discussed above, and convert the electricity from a direct current into an alternating current. The inverter 230, in turn, is operably connected to an automatic transfer switch 240 and a subpanel 250. In the shown embodiment, the automatic transfer switch 240 is configured to control a flow of electricity into and out of the subpanel 250. The subpanel 250, the trickle charger 280, and the automatic transfer switch are operably connected to an electrical panel 160. In this manner, both the electricity provided by the electrical panel 160, as well as the alternate power sources 270 are electrically connected to the rechargeable battery 200 and the flow of electricity into the subpanel 250 is controlled by the automatic transfer switch 240.

The automatic transfer switch is configured to monitor the flow of electricity from the electrical panel 160. When the automatic transfer switch detects an interruption of power, the automatic transfer switch can automatically transfer the flow of electricity into the subpanel 250 from the electrical panel 160 to the rechargeable battery 200. In this manner, the flow of electricity to the subpanel 250 remains uninterrupted, even in the event that the electrical panel 160 is unable to supply electricity due to an outage. In the shown embodiment, the automatic transfer switch 240 is disposed in the housing 110. In standard alternate power systems, automatic transfer switches are typically installed as a stand-alone component and must be independently monitored. By encapsulating the automatic transfer switch within the housing 110 additional installation and hardware is avoided.

In one embodiment, the trickle charger 280 is configured to enable the flow of alternating current from the electrical panel 160 through the tickle charter 280, transforming the alternating current to direct current into the rechargeable battery 200 when the rechargeable battery 200 is under eighty percent charged. In this manner, the trickle charger 280 can ensure that the rechargeable battery 200 is maintained at an eighty percent level even when the sources of alternate power are being utilized but may not be able to keep up with demand. In some other embodiments, the trickle charger 280 provides a similar function to the battery management system 210 and is configured to prevent the rechargeable battery 200 from overcharging. One of ordinary skill in the art will understand how the trickle charger 280 can monitor the status of the rechargeable battery 200 and determine whether electricity needs to be directed to the rechargeable battery 200, and the rate at which said electricity is delivered.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A battery powered generator, consisting of:
   a housing defined by a base, at least one sidewall disposed along a perimeter of the base, and a top disposed opposite the base;
   a rechargeable battery disposed within the housing;
   a pedal assembly, a wind turbine, and at least one solar panel, wherein each of the pedal assembly, the wind turbine, and the at least one solar panel are removably securable to the housing via at least one electric cable and received by at least one receptacle in the housing in electrical communication with the battery;
   the pedal assembly, the wind turbine, and the at least one solar panel operably connected to the rechargeable battery when secured to the housing;
   an electrical panel operably connected to the rechargeable battery via an inverter;
   a subpanel disposed in the housing operably connected to the rechargeable battery;
   an automatic transfer switch operably connected to the electrical panel, the rechargeable battery, and the subpanel; and
   the automatic transfer switch configured to control a flow of electricity into and out of the subpanel.

* * * * *